Figure 1:
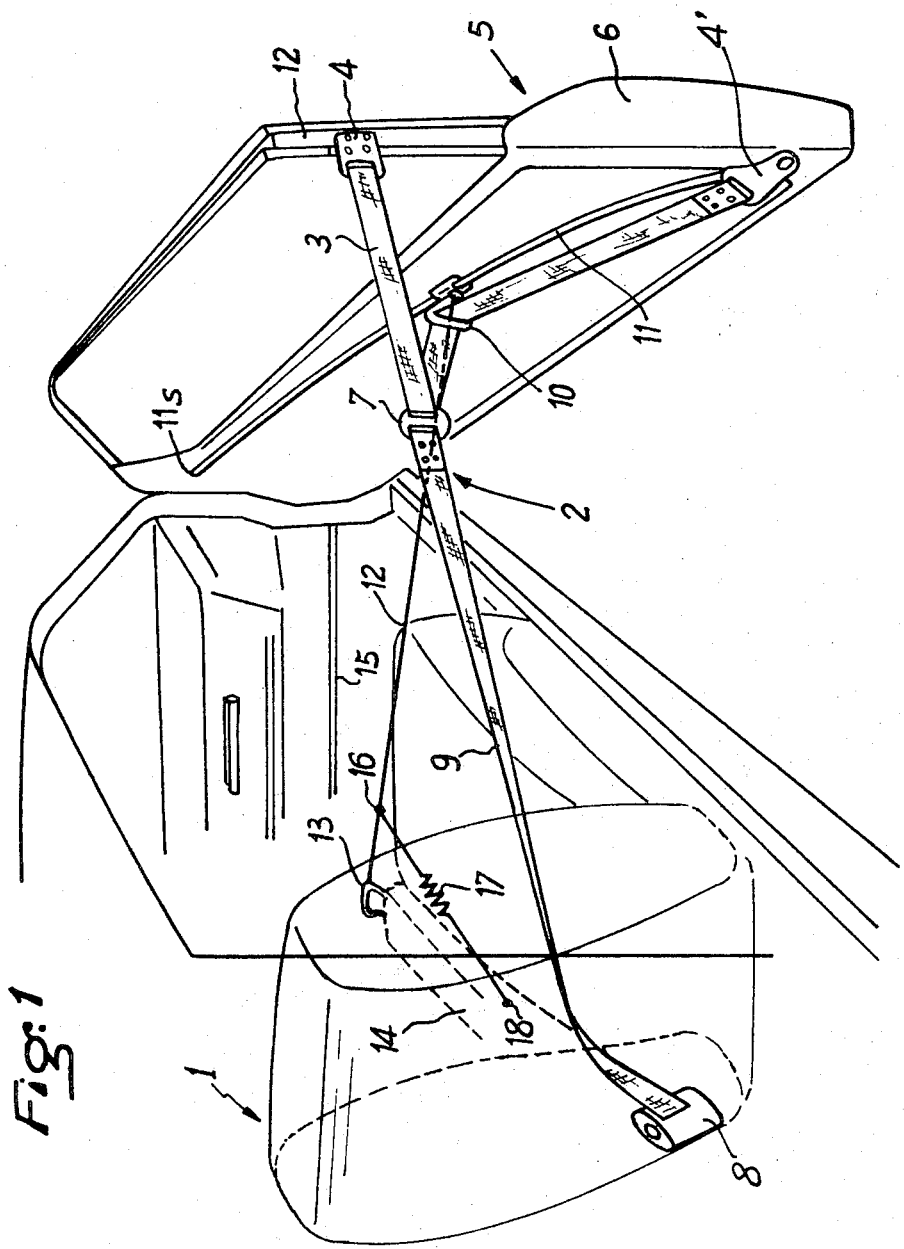

United States Patent [19]
Lefeuvre

[11] 3,827,714
[45] Aug. 6, 1974

[54] AUTOMATIC TENSIONING AND RELEASE DEVICES FOR AUTOMOTIVE SAFETY HARNESSES

[75] Inventor: André Lefeuvre, Billancourt, France

[73] Assignees: Regie Nationale des Usines Renault, Billancourt; Automobiles Peugeot, Paris, both of, France

[22] Filed: Oct. 31, 1972

[21] Appl. No.: 302,548

[30] Foreign Application Priority Data
Nov. 10, 1971 France .......................... 71.40357
May 17, 1972 France .......................... 72.17653

[52] U.S. Cl. .......................................... 280/150 SB
[51] Int. Cl. .......................................... B60r 21/10
[58] Field of Search .......................... 280/150 SB

[56] References Cited
UNITED STATES PATENTS
3,583,728 6/1971 Lindblad .................... 280/150 SB
3,679,229 7/1972 Weststrate ................. 280/150 SB
3,684,310 8/1972 Weststrate ................. 280/150 SB
3,727,944 4/1973 Wize ........................... 280/150 SB

*Primary Examiner*—Robert R. Song
*Attorney, Agent, or Firm*—Stevens, Davis, Miller & Mosher

[57] ABSTRACT

This device for retracting and restoring to an operative position the safety harnesses for the passengers of a motor vehicle comprises a safety harness consisting essentially of a strap, a pair of anchoring point for said strap which are disposed at different levels on the vehicle door and spaced laterally in relation to the seat adjacent to said door, a buckle slidably fitted on said strap, a first traction element secured to said buckle, a winder for said traction element secured to the passengers compartment at floor level, a strap guide element movable in relation to a fixed guide element and a second traction element for pulling said movable guide element, wherein one end of said second traction element is rigid with a fixed point of the passengers compartment and the other end is rigid with said movable guide element, the sliding buckle being also slidably mounted on said second traction element.

5 Claims, 10 Drawing Figures

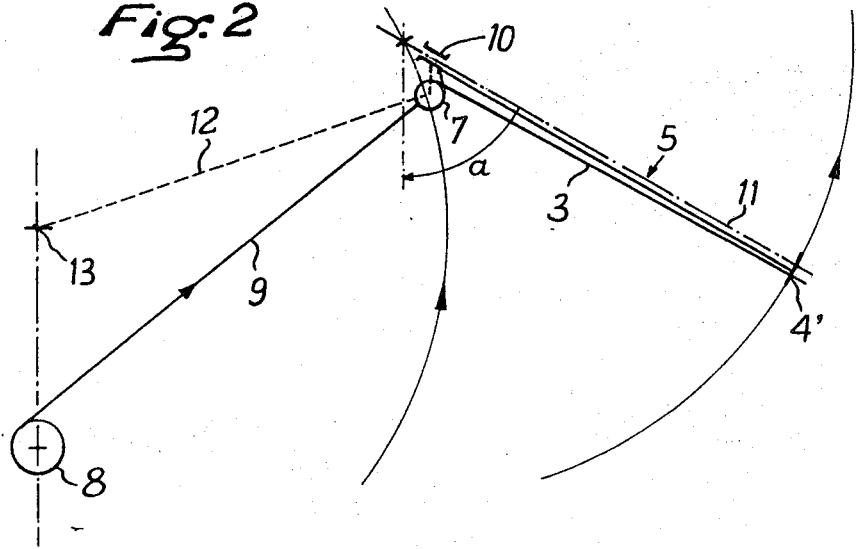
*Fig. 2*
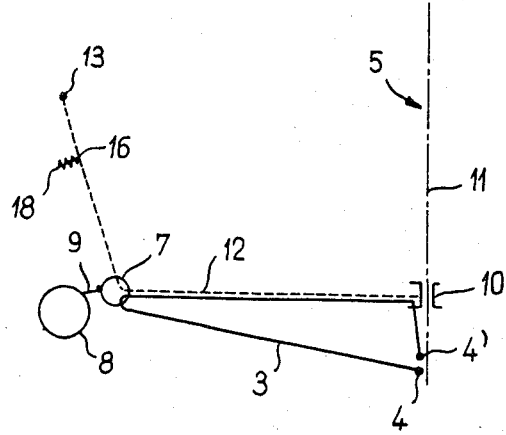
*Fig. 3*
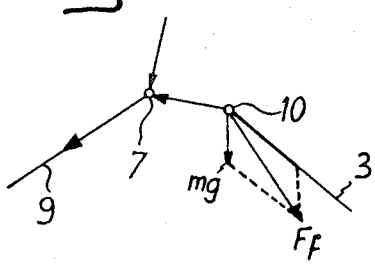
*Fig. 4*
*Fig. 5*

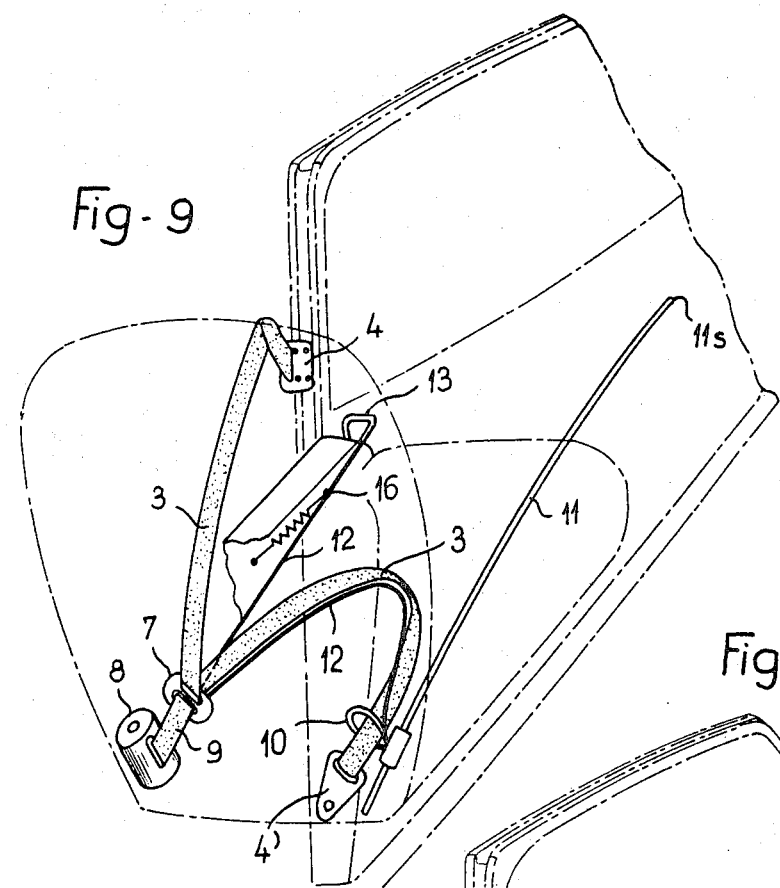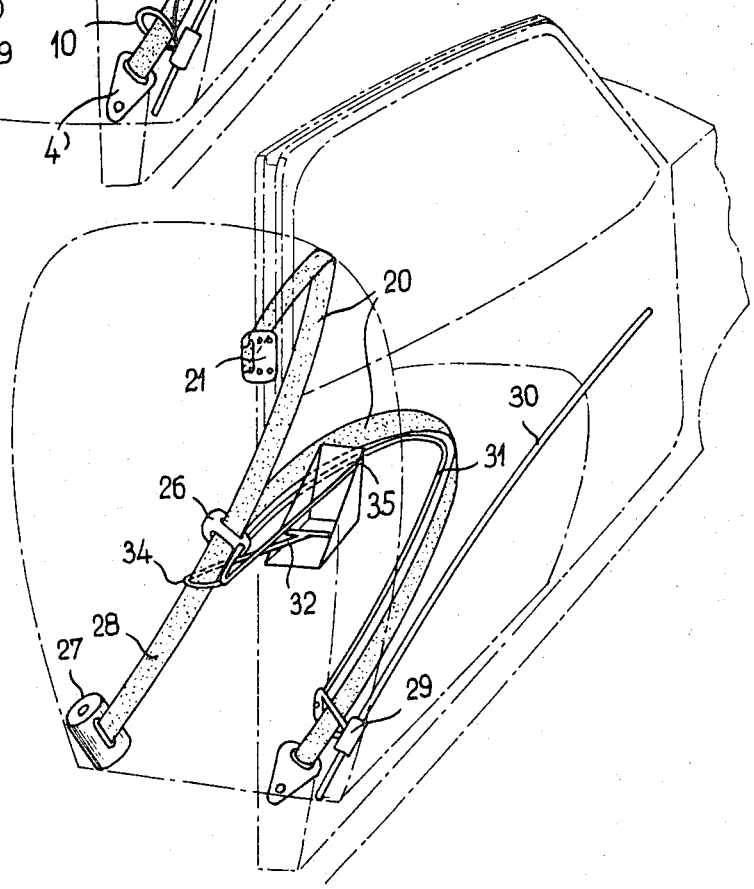

AUTOMATIC TENSIONING AND RELEASE DEVICES FOR AUTOMOTIVE SAFETY HARNESSES

The present invention relates in general to devices for retaining the passengers of a motor vehicle on their seats by means of safety harnesses or belts, and has particular reference to a device for automatically tensioning and releasing a safety harness of the type responsive to the closing and opening movements of a vehicle door.

It is known that devices of this character afford a considerable simplification in the fitting of the safety harness or belt around the user's body, and that they are so designed that they render the use of such harness compulsory and independent of the passenger's will.

This invention is applicable more particularly to known devices wherein one anchoring point of the safety harness is connected to the vehicle door and movable in relation thereof, guide means being provided for modifying the relative position of said anchoring point as a function of the angle of aperture of the door in order to facilitate the stepping in and out of the passengers when the door is open.

Such devices are well known wherein the means for anchoring the strap of the safety harness or belt are rigid with the seat and/or the vehicle body, and wherein one buckle adapted to slide along said strap is movable along a guide member mounted to the door.

These devices comprise a strap winder the principle of operation of which is such that it permits the elongation of said strap but against the antagonistic force of a spring or motor means tending to withdraw the strap within the winder.

On the other hand, it is known that the safety harness sliding members mounted on the vehicle door require a certain work for obtaining a reliable movement of the strap along the guide members during the opening and closing movements of the door. In most instances this work is accomplished either directly by the user controlling the door or through a mechanism the operation of which controlled in two door positions is attended by the automatic downward or upward movement of the strap in order to clear the threshold of the vehicle door.

It is the essential object of this invention to provide:

a device for withdrawing and positioning a safety harness, wherein one fraction of the work necessary for moving the strap along guide members rigid with the vehicle door is accomplished by two traction elements;
a device for automatically putting the safety harness in its working condition, wherein the winder associated with a first traction element is rigid with the seat or floor of the vehicle, so that the potential energy previously stored by the power means incorporated in the winder is converted into work acting in the door closing direction while facilitating the movement of the strap along guide members secured to the vehicle door, so that said power means will act in the direction to reduce the reaction stress counteracting the strap movement;
and a device utilizing a second traction element separate from the first traction element and adapted during the door opening movement to move a guide element, in the form of a strap conveying slide, along a guideway.

This device comprises a safety harness or belt, two anchoring points of said harness which are disposed at two different levels on the vehicle door and spaced laterally in relation to the seat adjacent to said door, a buckle adapted to slide along said harness, a first traction element secured to said buckle, a winder for said traction element, secured within the passengers compartment at floor level, a first guide element rigid with the vehicle door, a second guide element movable in relation to said first guide element and guided thereby, and a second traction element; this device being characterised in that one end of said second traction element is rigid with a fixed point of the passengers compartment while the other end of this second element is rigid with the second guide element, and that the sliding buckle is also slidably mounted on said second traction element.

This invention is also concerned with a complementary arrangement aiming at improving the withdrawal of the harness during the door opening movement in order to increase the distance from the traction strap and the seat surface.

Basically, this arrangement is characterised in that said first traction element and said second traction element are slidably mounted at one end of an arm pivoted ahead of the winder and at the remotest ends thereof, so as to be normally urged towards the winder by the effort exerted by this winder on the first traction element and liable to be raised to a nearly vertical position when the door is opened.

Figure 6:
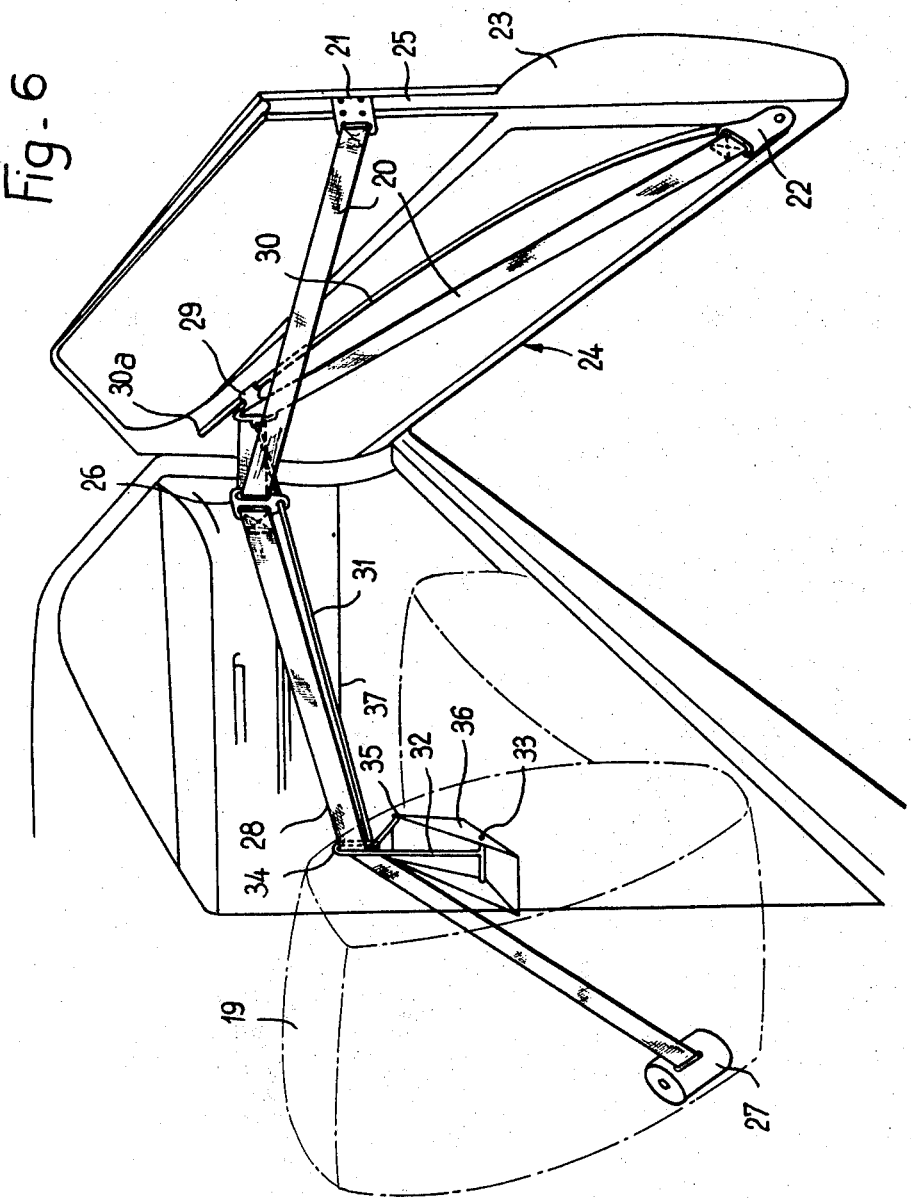
Figure 7:
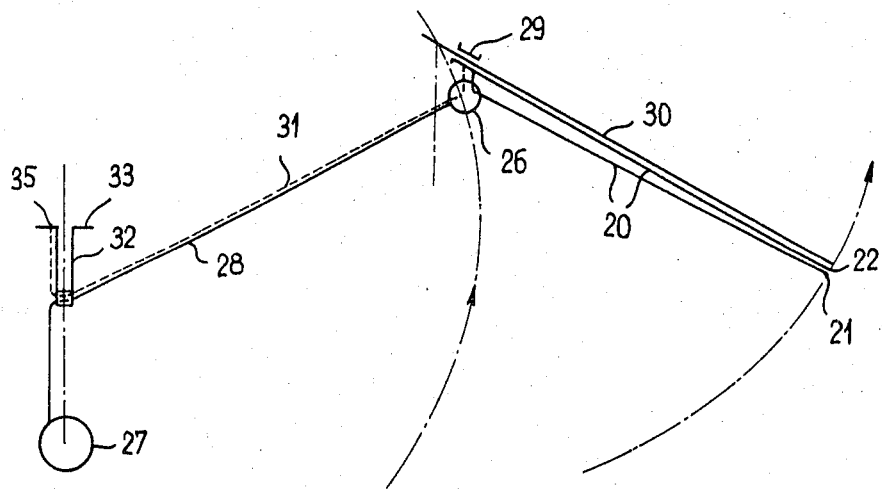
Figure 8:
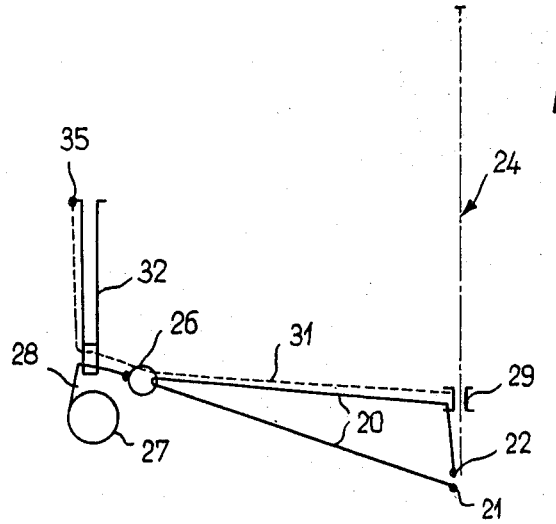

Other features and advantages characterising this invention will appear as the following description proceeds with reference to the accompanying drawings illustrating various forms of embodiment of the invention. In the drawings:

FIG. 1 is a perspective view of the device;
FIG. 2 is a diagrammatic illustration of the device of FIG. 1 in the position obtaining when the vehicle door is open;
FIG. 3 is another diagrammatic illustration of the device of FIG. 1 in the position obtaining when the vehicle door is closed;
FIG. 4 is a vectorial illustration of the stresses exerted on the second guide element during the door closing movement;
FIG. 5 is another vectorial illustration of the stresses exerted on the second guide element during the door opening movement;
FIG. 6 is a perspective view of the device;
FIG. 7 is a diagrammatic illustration of the device of FIG. 6 in the door opening position;
FIG. 8 is another diagrammatic illustration of the device of FIG. 6 in the door closing position;
FIG. 9 is a perspective view of the device shown in FIG. 1 when the door is closed; and
FIG. 10 is another perspective view of the device shown in FIG. 6 when the door is closed.

Referring to FIG. 1, there is shown diagrammatically a seat 1, a safety harness or belt 2 comprising a strap 3 in the position obtained when the vehicle door is open.

The harness 2 is secured to the vehicle door and to the seat. To this end, two harness anchoring points 4, 4' are provided at two different levels in the vicinity of the rear vertical side 6 of door 5. As clearly shown in FIG. 1, these anchoring points 4, 4' may move laterally away from the adjacent seat 1 when the door is opened.

Although the anchoring points illustrated in the drawings are fixed, an adjustable anchoring point could be provided, notably on the frame 12 of the door for adapting the device to the morphological characteristics of the seat user.

A buckle 7 is attached to the winder 8 through a first traction element 9 such as a strap normally retracted or wound in said winder 8; in this example the winder 8 is attached to the seat 1 secured to the passengers compartment at the level of the vehicle floor. The first traction element 9 is shown in FIG. 1 for the purpose of illustrating the position assumed by this element when the door is open.

In FIGS. 2 and 3 the line 5 designates diagrammatically the door, and the strap 3 is passed through the buckle 7 and also through a movable guide element 10 adapted to travel along a fixed guide element 11 provided on the inner panel of door 5. As already mentioned hereinabove, the first traction element 9, in this case is partially stored in the winder 8.

According to the operating characteristic of the harness positioning device of this invention, the first traction element 9 exerts a stress on the second movable guide element 10, corresponding to a weight mg, and tends to move the guide element 10 towards the anchoring point 4' along the guide element 11 during the door closing movement, as a consequence of the force $F_f$ which is the resultant of the stresses exerted by the traction element 9 on the guide element 10. It is clear that the orientation or direction of this resultant force $F_f$ depends both on the angle of aperture $a$ of the door 1 and on the direction of this angle.

Under these conditions it is clear that the device permits the automatic positioning of the harness during the door closing movement. FIG. 9 illustrates the device of FIG. 1 when the door is closed. To this end, the buckle 7 tends to move towards the winder 8 due to the change occurring in the orientation of the resultant force $F_f$ and also in the angle $a$.

According to a specific feature of this invention, a second traction element 12 exerts a stress on the guide element 10 and tends to bring the latter towards the upper end 11s of guide element 11 during the door opening movement. FIG. 5 illustrates a static condition of the device during the door opening movement and clearly shows the origin of the force $Fa$ (which is the resultant of the stress exerted on the guide element 10 by the second traction element 12 and of the control effort exerted on the door for opening same).

It is thus clear that the device also permits the automatic withdrawal of the safety harness during the door opening movement. To this end, the buckle 7 tends to move away from the winder 8.

According to another feature characterising this invention the end of the second traction element 12 is rigid with a first fixed point 13 located within the passengers compartment. One may position notably the fixed point 13 on the arm rest 14 of seat 1 or under the instrument panel 15. Of course, it is possible to conceal this second traction element 12 in a sheath or the like, also disposed under the instrument panel or dash board.

According to a third feature characterising this invention, the buckle 7 is slidably mounted on the second traction element 12 of which the length is adjustable in order better to clear the access to the vehicle and to the seat.

To this end the traction member 12 carries the anchoring point 16 of a return member. This return member may consist for example of a spring 17 having its fixed end attached to a second fixed point 18 of the passengers compartment. Thus, the traction member 12 exerts an improved pull irrespective of the angle of aperture of the vehicle door.

In the arrangement illustrated in FIG. 6 there is shown a seat 19 and a safety harness comprising a strap 20, the latter being shown in the position obtained when the vehicle door is open.

The ends of strap 20 are attached to a pair of anchoring points 21, 22 disposed at two different levels in the vicinity of the rear vertical side 23 of door 24.

Although the anchoring points illustrated in the drawings are fixed, it is also possible, of course, to provide an adjustable anchoring system notably on the window frame or upper upright 25 of door 24 to permit the adaptation of the device to the particular morphological characteristics of the user.

Slidably mounted on strap 20 is a buckle 26 connected on the other hand to a winder 27 through a first strap-forming traction element 28 normally wound inside this winder, the winder proper being in this case rigid with the seat 19 or secured to the compartment at floor level.

The lower section of strap 20 is also adapted to slide in a movable guide element 29 adapted in turn to travel along a fixed guide element 30 provided on the inner panel of door 24.

A second traction element 31 is disposed and connected through said buckle 26 to the guide element 29 in order to cause same to travel towards the upper end 30a of guide element 30 during the door opening movement.

In this form of embodiment the traction strap 28 and the auxiliary traction element 31 are slidably mounted through the free end of an arm 32 pivoted ahead of the winder 27 to a pin 33, the arrangement being such that this arm 32, normally urged towards the winder 27 by the efforts exerted by this winder on the traction strap 28 (see FIG. 3) is adapted to be raised to a substantially vertical position during the door opening movement, as illustrated in FIGS. 6 and 7. This sliding mounting is provided in this example by engaging the strap 28 in a buckle 34 carried by the end of arm 32. The second traction element 31 is preferably anchored (as shown at 35 in this example) to the bracket 36 pivotally supporting the arm 32.

According to another form of embodiment of this invention the arm 32 may consist of a portion of an elbow-rest disposed between the two seats of the vehicle, the pivot pin 33 being level with the foremost portion of the seat cushion. However, this pin 33 may also be located at a more advanced position, for example, in the vicinity of the instrument panel 37.

FIG. 6 clearly shows that these various arrangements are conducive, during the door opening movement, to an automatic release of the safety harness in relation to the seat, in the forward direction, upwards and laterally, so that the user may step out from the vehicle without being unduly hampered by the device. When closing the door, the winder will automatically restore the safety harness to its service position as illustrated in FIG. 8. FIG. 10 illustrates the embodiment shown in FIG. 6 when the door is closed.

Of course, the various devices described herein and illustrated in the drawings may be associated with any desired type of anchoring means, advantageously with the anchoring means adapted to be equipped with a device for absorbing the kinetic energy, for the purpose of permitting a plastic elongation of the harness or strap in case of considerable traction stress of short duration.

It will readily occur to those conversant with the art that various modifications and variations may be brought to the specific forms of embodiment of the invention which are shown and described herein, without departing however from the basic principles of the invention as set forth in the appended claims.

What is claimed as new is:

1. Device for withdrawing and repositioning a safety harness for the passengers of an automotive vehicle which comprises
    a pair of anchoring points for said harness disposed at vertically spaced different levels on a door of the vehicle and spaced laterally from the seat adjacent to said door,
    said safety harness connected at each end to said anchoring points and controlled by a first and second moveable element,
    said first moveable element comprising a buckle slidable along said harness,
    a winder for a first traction element secured to an inboard portion of the passenger compartment of said vehicle at the floor level,
    said first traction element extending from said winder and secured to said buckle,
    said second moveable element comprising a moveable guide element through which the harness is adapted to slide,
    a fixed guide element in the door of the vehicle extending from the lower inner rear corner toward the upper inner front corner of the door panel along which said moveable guide element slides, and
    a second traction element, having one end rigid with a fixed point in the passenger compartment, in sliding engagement with said buckle and rigid at the other end thereof with said movable guide element.

2. A device according to claim 1, further comprising a return member having one end rigid with a fixed second point in the passenger compartment and its other end anchored to said second traction member.

3. A device according to claim 1, further comprising an arm pivotally mounted in a position in front of said winder when the door is closed with said arm extending toward said winder and having a free end through which said first and second traction elements are engaged, said free end normally being urged toward said winder by said first traction element and adapted to be raised to a substantially vertical position when the vehicle door is opened.

4. A device according to claim 3, wherein the fixed point on the passenger compartment for said second traction element acts as a supporting bracket for said arm.

5. A device according to claim 3, wherein said pivoted arm is incorporated into an arm-rest positioned between the seats of the vehicle with the pivot pin on said arm being level with the foremost portion of the seat cushion.

* * * * *